US006922598B2

United States Patent
Lim et al.

(10) Patent No.: US 6,922,598 B2
(45) Date of Patent: Jul. 26, 2005

(54) SYSTEM AND METHOD FOR TRANSFERRING HOME APPLIANCE CONTROL DATA

(75) Inventors: Hyung Tack Lim, Euiwang-si (KR); Il Hoon Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 10/156,795

(22) Filed: May 30, 2002

(65) Prior Publication Data

US 2003/0040811 A1 Feb. 27, 2003

(30) Foreign Application Priority Data

Aug. 24, 2001 (KR) ........................................ 2001-51327

(51) Int. Cl.[7] .............................................. G06F 17/00
(52) U.S. Cl. ........................... 700/90; 707/10; 709/218
(58) Field of Search ...................... 700/83, 90; 707/10; 709/203, 217, 218

(56) References Cited

U.S. PATENT DOCUMENTS 6,121,593 A * 9/2000 Mansbery et al. .......... 219/679
6,539,433 B1 * 3/2003 Tominaga et al. .......... 709/246
6,680,730 B1 * 1/2004 Shields et al. .............. 345/169

* cited by examiner

*Primary Examiner*—Albert W. Paladini
(74) *Attorney, Agent, or Firm*—Birch, Stewart, Kolasch & Birch, LLP

(57) ABSTRACT

A system and method for transferring home appliance control data, wherein a control data provision server stores a plurality of data for control of a home appliance and a unified Java application for execution of the plurality of control data. The control data provision server stores the same number of Java applications as that of a plurality of Java virtual machines contained respectively in a plurality of Java phones, resulting in no necessity for each Java phone to download respective Java applications whenever downloading respective control data. Therefore, the control data provision server can be reduced in capacity and burden thereon, and in turn in construction and maintenance costs.

16 Claims, 3 Drawing Sheets

SYSTEM AND METHOD FOR TRANSFERRING HOME APPLIANCE CONTROL DATA

BACKGROUND OF THE INVENTION

1. Field of the Invention

The present invention relates to systems and methods for transferring home appliance control data, and more particularly to a system and method for transferring home appliance control data, which can reduce a burden on a control data provision server that stores data for control of a home appliance and Java applications for execution of the control data in Java phones.

2. Description of the Related Art

Recently, home appliances connectable to the Internet and controllable by users outside of their homes have been significantly increasingly used.

Such home appliances are generally equipped with communication modules, such as local area network (LAN) cards or modems, so as to be connectable to the Internet, transmit and receive information to/from the Internet and be controllable over the Internet. Also, home appliances connected to the Internet transmit information regarding their operating states to the Internet, so that users of the home appliances can monitor the operating states of the appliances over the Internet.

However, the installation of separate communication modules in home appliances for connection of the appliances to the Internet, as mentioned above, increases manufacturing costs of the appliances and in turn reduces the competitiveness of the appliances in the market place.

In order to avoid the above problems, a system has been developed and used which, without installing communication modules in home appliances, connects the home appliances to a personal computer (PC) usually used in a home and in turn connects them to the Internet through the PC, and then controls the appliances over the Internet. However, because the PC is a computing device fixed in one specific place, a user must always inconveniently move to the specific place to control the home appliances using the PC.

In order to remove the above inconvenience, a cellular phone-based home appliance control system has recently been proposed which connects a home appliance to a cellular phone and transfers control information to the home appliance through the cellular phone to control the appliance.

A cellular phone generally used in the cellular phone-based home appliance control system is a Java phone including a Java virtual machine for execution of a Java application. The Java phone stores a Java application for downloading and executing control data. That is, as the Java application stored in the Java phone is executed, control data is downloaded.

By way of example, assume that a plurality of Java phones 3 and 4 are provided to transfer control data to one home appliance 1 and have Java virtual machines (not shown) of different Java program coding schemes, respectively, as shown in FIG. 1. In this case, a control data provision server 2, which stores control data and Java applications for execution thereof, must have the same number of Java applications per one control data as that of the Java virtual machines contained in the Java phones 3 and 4.

In other words, provided that the control data provision server 2 has 200 control data and three types of Java phones exist, the server 2 will have to store 600 Java applications. This increases the capacity of the server 2 and a burden thereon.

SUMMARY OF THE INVENTION

Therefore, the present invention has been made in view of the above problems, and it is an object of the present invention to provide a system and method for transferring home appliance control data, wherein a control data provision server stores a plurality of data for control of a home appliance and a unified Java application for execution of the plurality of control data, so that it can be reduced in capacity and burden thereon.

In accordance with one aspect of the present invention, the above and other objects can be accomplished by the provision of a home appliance control data transfer system, comprising: at least one home appliance controllable according to a plurality of external input control data; a plurality of Java phones connectable to the home appliance for transferring the plurality of control data thereto; and a control data provision server for storing the plurality of control data and a plurality of Java applications for execution of the plurality of control data in the Java phones, respectively, based on types of the Java phones.

In accordance with another aspect of the present invention, there is provided a method for transferring data for control of at least one home appliance, comprising the steps of: a) constructing a control data provision server for storing the home appliance control data and a plurality of Java applications for execution of the control data in Java phones connected to the home appliance, respectively, based on types of Java virtual machines included respectively in the Java phones; b) if a specific one of the Java phones desires to download the control data from the control data provision server, downloading any one of the Java applications corresponding to the type of the Java virtual machine included in the specific Java phone from the control data provision server to the specific Java phone; c) downloading the control data from the control data provision server to the specific Java phone as the corresponding Java application downloaded at the step b) is executed in the specific Java phone; and d) transferring the control data downloaded at the step c) from the specific Java phone to the home appliance to control the appliance according to the transferred control data.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
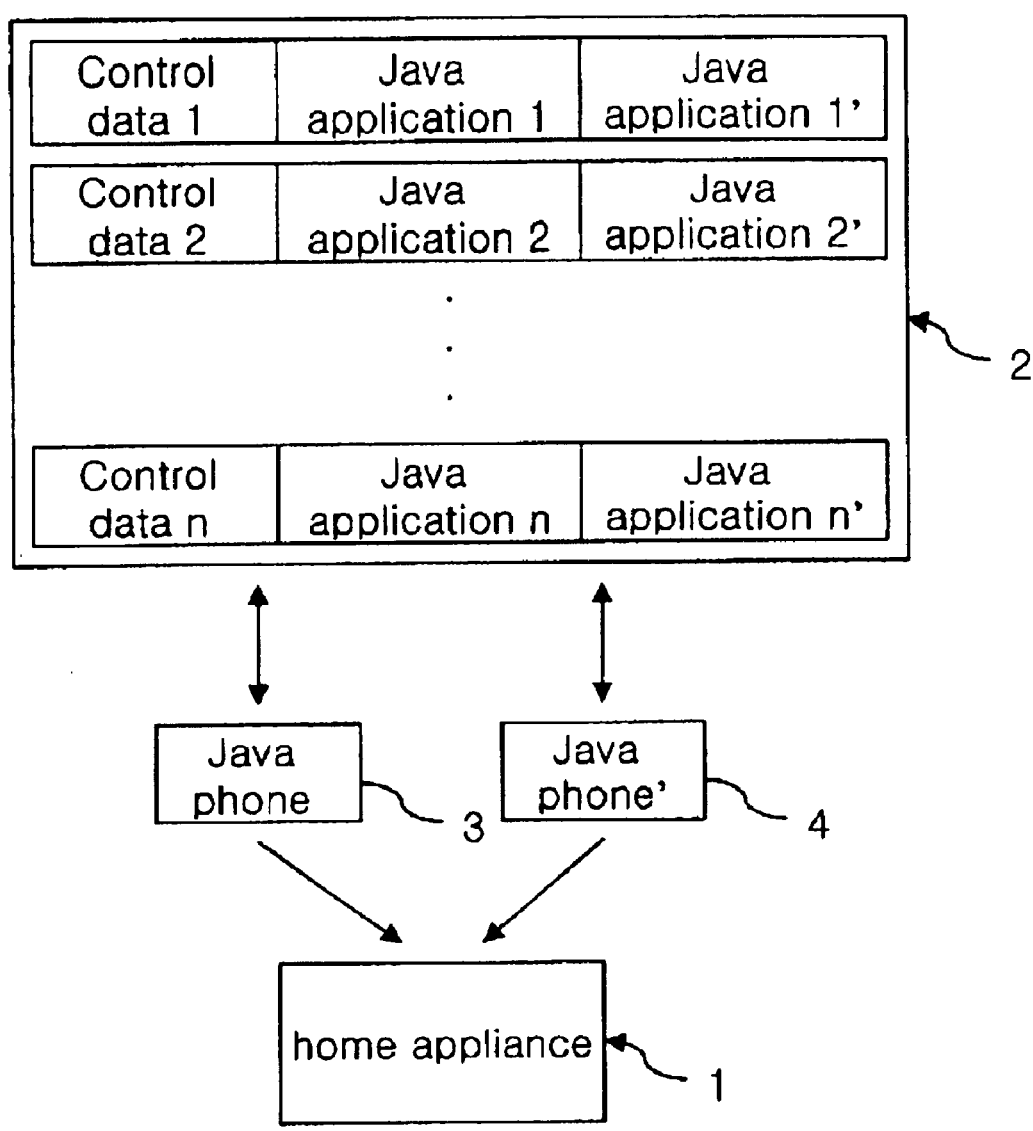
FIG. 1 is a block diagram showing the construction of a conventional system for transferring home appliance control data.
Figure 2:
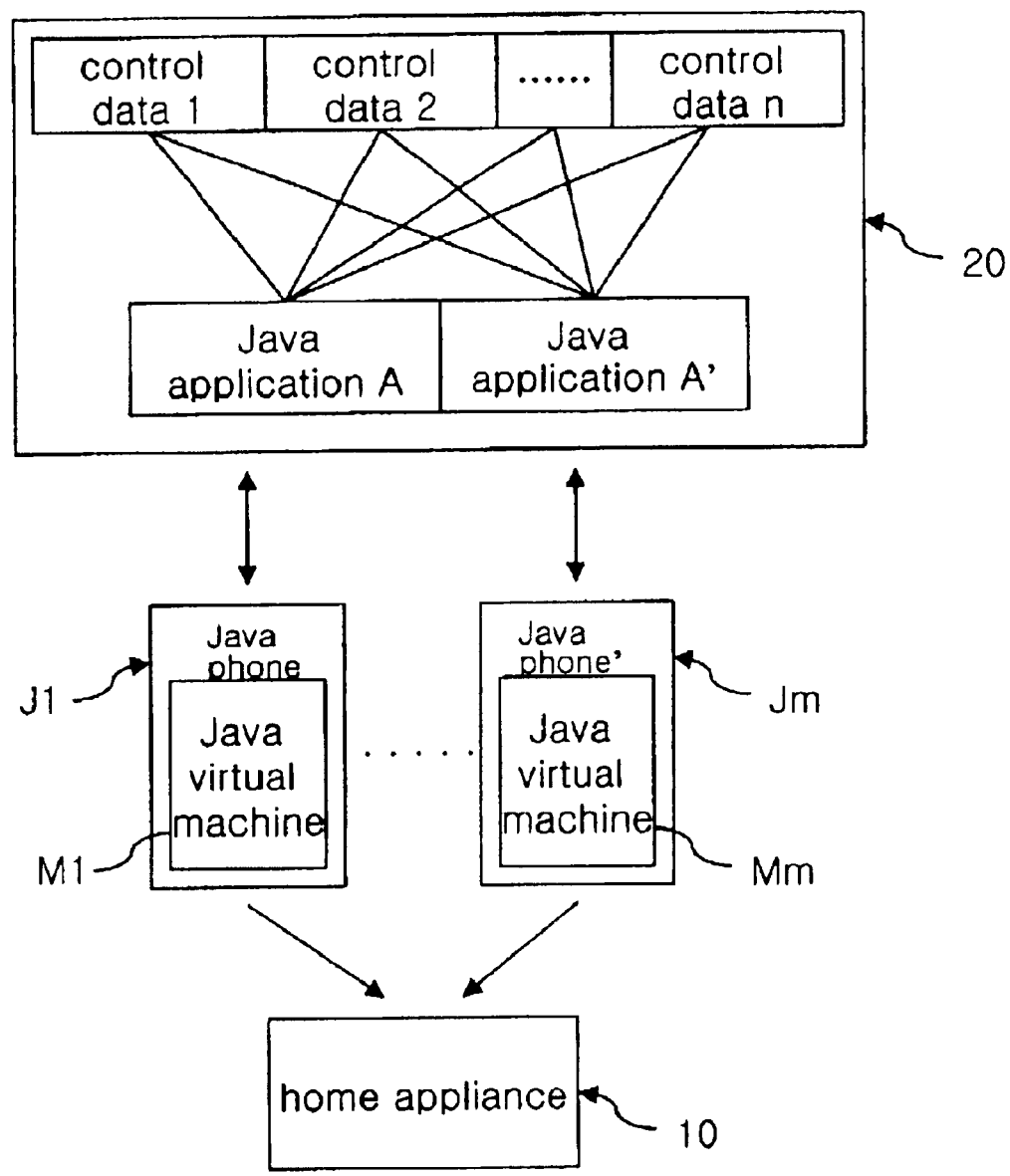
FIG. 2 is a block diagram showing the construction of a system for transferring home appliance control data in accordance with the present invention.

With reference to FIG. 2, there is shown in block form the construction of a system for transferring home appliance control data in accordance with the present invention. As shown in this drawing, the home appliance control data transfer system comprises a home appliance 10 controlled according to a plurality of control data transferred thereto, a plurality of Java phones J1 to Jm, each for downloading and executing the plurality of control data to be transferred to the home appliance 10 and a Java application for execution of the control data, and a control data provision server 20 for storing the plurality of control data and the Java applications to be downloaded respectively to the Java phones J1 to Jm.

The Java phones J1 to Jm must first download and execute the Java applications in order to download and execute the control data. To this end, the Java phones J1 to Jm include Java virtual machines M1 to Mm for execution of the Java applications, respectively.

In particular, the Java phones J1 to Jm have different types of Java virtual machines, respectively. Namely, the Java phones J1 to Jm are adapted to execute respective Java applications of slightly different coding schemes although they are Java programs. For this reason, the Java phones J1 to Jm have to download Java applications executable respectively in the Java virtual machines therein from the control data provision server 20.

In a conventional home appliance control data transfer system, a Java phone must download and execute a Java application based on specifications of each control data in order to download and execute the control data. Namely, the Java phone has to first download and execute three Java applications in order to download and execute three control data to transfer them to a home appliance.

However, in the present home appliance control data transfer system, Java applications for execution of a plurality of control data are unified into one application. Thus, for downloading and execution of a plurality of control data, the same Java application can be used when Java phones include the same Java virtual machine.

That is, as shown in FIG. 2, the control data provision server 20 stores a plurality of control data and the same number of Java applications as that of types of Java virtual machines contained in Java phones. If the first Java phone J1 and the second Java phone J2 have different types of Java virtual machines, the control data provision server 20 stores two Java applications executable respectively in the first and second Java phones J1 and J2.

Accordingly, the first Java phone J1 gains access to the control data provision server 20 and then downloads a Java application A appropriate to the type of its Java virtual machine from the server 20. At this time, after accessing the control data provision server 20, the first Java phone J1 compares information regarding the type of its Java virtual machine with information regarding a type of a Java virtual machine for execution of the Java application A stored in the control data provision server 20 to determine whether they are the same. If the two information are the same, the first Java phone J1 downloads the Java application A from the control data provision server 20.

Preferably, the control data provision server 20 maps information regarding types of Java virtual machines for execution of the plurality of Java applications A and A', respectively, to the Java applications A and A' and stores the mapped information. As a result, the Java phones compare the information regarding the types of their Java virtual machines with the information regarding the types of the Java virtual machines mapped and stored to the Java applications, and download the Java applications in accordance with the compared results, respectively.

Figure 3:
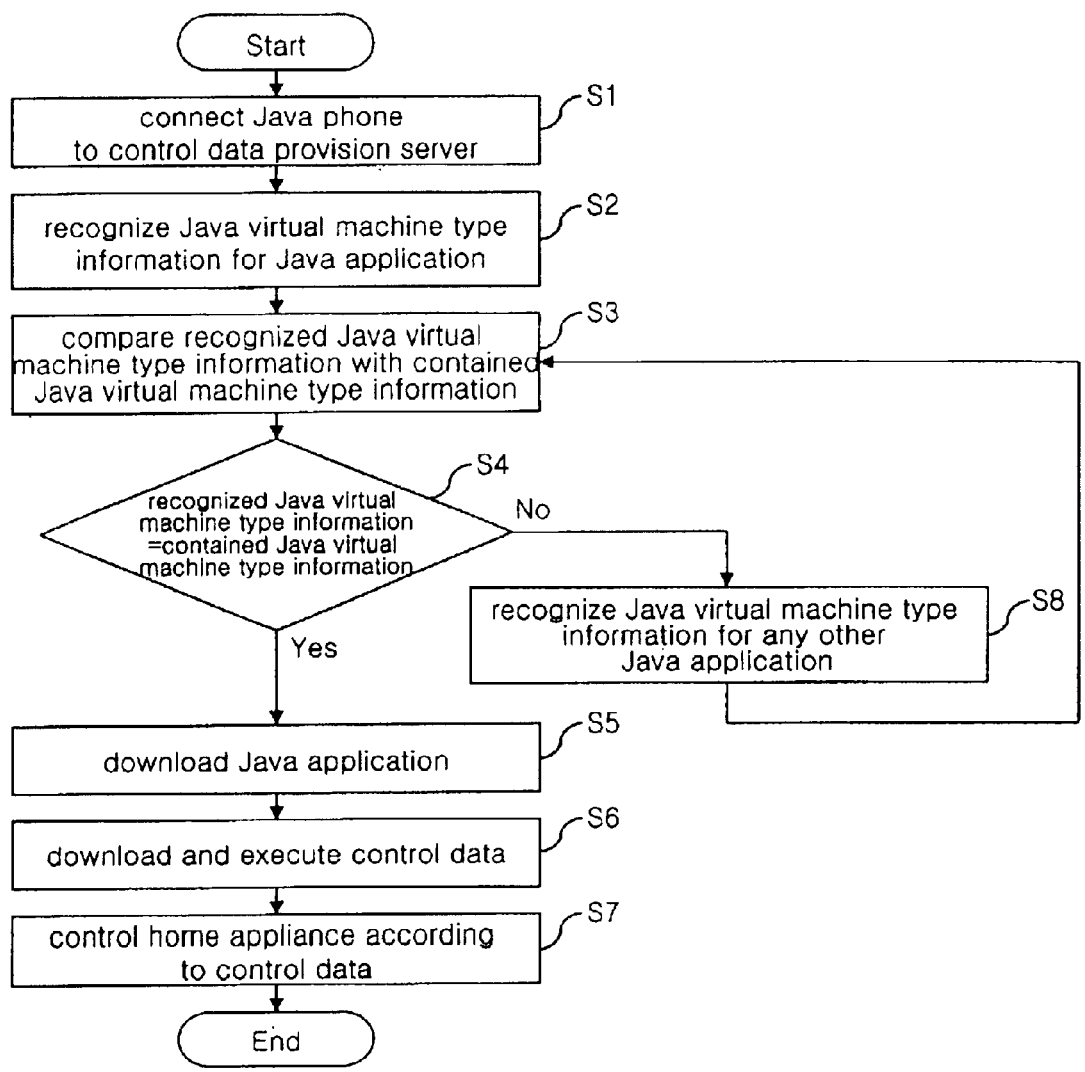
FIG. 3 is a flow chart illustrating a method for transferring home appliance control data in accordance with the present invention.

The operation of the home appliance control data transfer system with the above-stated construction in accordance with the present invention will hereinafter be described in detail with reference to FIG. 3.

At the first step S1, a Java phone is connected to a control data provision server which stores data for control of a home appliance and a Java application associated therewith.

At the second step S2, the Java phone recognizes information regarding a type of a Java virtual machine for execution of the Java application stored in the control data provision server.

At the third step S3, the Java phone compares the Java virtual machine type information recognized at the above second step S2 with information regarding a type of a Java virtual machine contained therein.

At the fourth step S4, the Java phone determines whether the recognized Java virtual machine type information is the same as the type information of the contained Java virtual machine.

Upon determining at the above fourth step S4 that the recognized Java virtual machine type information is the same as the type information of the contained Java virtual machine, the Java phone downloads the Java application from the control data provision server at the fifth step S5.

At the sixth step S6, the Java phone executes the downloaded Java application, and then downloads, processes and executes the control data from the control data provision server.

At the seventh step S7, the Java phone transfers the executed control data to the home appliance, which is then controlled according to the transferred control data.

On the other hand, in the case where the recognized Java virtual machine type information is determined not to be the same as the type information of the contained Java virtual machine at the above fourth step S4, the Java phone recognizes information regarding a type of a Java virtual machine for execution of any Java application stored in the control data provision server, other than the Java application corresponding to the Java virtual machine type information recognized at the above second step S2, at the eighth step S8, and then returns to the above third step S3.

As apparent from the above description, the present invention provides a system and method for transferring home appliance control data, wherein a control data provision server stores a plurality of data for control of a home appliance and a unified Java application for execution of the plurality of control data. The control data provision server stores the same number of Java applications as that of a plurality of Java virtual machines contained respectively in a plurality of Java phones, resulting in no necessity for each Java phone to download respective Java applications whenever downloading respective control data. Therefore, the control data provision server can be reduced in capacity and burden thereon, and in turn in construction and maintenance costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home appliance control data transfer system, comprising:
    at least one home appliance controllable according to a plurality of external input control data;
    a plurality of Java phones connectable to said home appliance for transferring said plurality of control data thereto; and
    a control data provision server for storing said plurality of control data and a plurality of Java applications for execution of said plurality of control data in said Java phones, respectively, based on types of said Java phones wherein each of said Java phones includes a Java virtual machine for gaining access to said control data provision server and then downloading and executing a corresponding one of said Java applications from said control data provision server.

2. The home appliance control data transfer system as set forth in claim 1, wherein said control data provision server is adapted to send said corresponding Java applications executable respectively in said Java virtual machines of said Java phones, respectively, to said Java phones after being connected to said Java phones.

3. The home appliance control data transfer system as set forth in claim 2, wherein each of said Java phones is adapted to download said control data from said control data provision server and transfer the downloaded control data to said home appliance, as said corresponding Java application sent from said server is executed therein.

4. The home appliance control data transfer system as set forth in claim 2, wherein the number of said Java applications stored in said control data provision server is the same as that of said Java virtual machines included in said Java phones connectable to said home appliance; and
    wherein said control data provision server is adapted to send said corresponding Java applications respectively to said Java phones even when said Java phones request said server to send the same control data, said corresponding Java applications being different according to types of said Java virtual machines included in said Java phones.

5. The home appliance control data transfer system as set forth in claim 1, wherein said Java applications stored in said control data provision server are different according to coding schemes of Java programs used in said Java phones.

6. A method for transferring data for control of at least one home appliance, comprising the steps of:
    a) constructing a control data provision server for storing said home appliance control data and a plurality of Java applications for execution of said control data in Java phones connected to said home appliance, respectively, based on types of Java virtual machines included respectively in said Java phones;
    b) if a specific one of said Java phones desires to download said control data from said control data provision server, downloading any one of said Java applications corresponding to the type of said Java virtual machine included in said specific Java phone from said control data provision server to said specific Java phone;
    c) downloading said control data from said control data provision server to said specific Java phone as said corresponding Java application downloaded at said step b) is executed in said specific Java phone; and
    d) transferring said control data downloaded at said step c) from said specific Java phone to said home appliance to control said appliance according to the transferred control data.

7. The method as set forth in claim 6, wherein said step a) includes the step of mapping information regarding types of Java virtual machines for execution of said Java applications, respectively, to said Java applications and storing the mapped information in said control data provision server.

8. The method as set forth in claim 7, wherein said Java applications stored in said control data provision server are different according to coding schemes of Java programs used in said Java phones.

9. The method as set forth in claim 7, wherein said step b) includes the steps of:
    b-1) connecting said specific Java phone to said control data provision server;
    b-2) determining which one of said Java applications stored in said control data provision server is executable in said Java virtual machine included in said specific Java phone; and
    b-3) downloading said Java application determined at said step b-2) from said control data provision server to said specific Java phone.

10. The method as set forth in claim 9, wherein said step b-2) includes the step of comparing information regarding the type of said Java virtual machine included in said specific Java phone with a corresponding one of the mapped Java virtual machine type information stored in said control data provision server to determine whether the two information are the same, and then proceeding to said step b-3) if the two information are determined to be the same.

11. A home appliance control data transfer system, comprising:
    at least one home appliance controllable according to a plurality of external input control data;
    a plurality of Java phones connectable to said home appliance for transferring said plurality of control data thereto, said plurality of Java phones having features different from one another; and
    a control data provision server for storing said plurality of control data and a plurality of Java applications for execution of said plurality of control data in said Java phones, respectively, based on the features of said Java phones.

12. The home appliance control data transfer system as set forth in claim 11, wherein each of said Java phones includes a Java virtual machine for gaining access to said control data provision server and then downloading and executing a corresponding one of said Java applications from said control data provision server.

13. The home appliance control data transfer system as set forth in claim 12, wherein said control data provision server is adapted to send said corresponding Java applications executable respectively in said Java virtual machines of said Java phones, respectively, to said Java phones after being connected to said Java phones.

14. The home appliance control data transfer system as set forth in claim 13, wherein each of said Java phones is adapted to download said control data from said control data provision server and transfer the downloaded control data to said home appliance, as said corresponding Java application sent from said server is executed therein.

15. The home appliance control data transfer system as set forth in claim 13, wherein the number of said Java applications stored in said control data provision server is the same as that of said Java virtual machines included in said Java phones connectable to said home appliance; and wherein said control data provision server is adapted to send said corresponding Java applications respectively to said Java phones even when said Java phones request said server to send the same control data, said corresponding Java applications being different according to types of said Java virtual machines included in said Java phones.

16. The home appliance control data transfer system as set forth in claim 12, wherein said Java applications stored in said control data provision server are different according to coding schemes of Java programs used in said Java phones.

* * * * *